United States Patent
Aaron et al.

(10) Patent No.: US 9,705,972 B2
(45) Date of Patent: Jul. 11, 2017

(54) MANAGING A SET OF DATA

(71) Applicant: International Business Machines Corporation, Armonk, NY (US)

(72) Inventors: Andrew S. Aaron, Ardsley, NY (US); Joel W. Branch, Hamden, CT (US); Shang Q. Guo, Cortlandt Manor, NY (US); Jonathan Lenchner, North Salem, NY (US); Daniel A. Mazzella, Henderson, NV (US); Maharaj Mukherjee, Poughkeepsie, NY (US); John C. Nelson, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/529,653

(22) Filed: Oct. 31, 2014

(65) Prior Publication Data

US 2016/0124946 A1 May 5, 2016

(51) Int. Cl.
G06F 17/30 (2006.01)
H04L 29/08 (2006.01)

(52) U.S. Cl.
CPC ........ H04L 67/10 (2013.01); G06F 17/30864 (2013.01)

(58) Field of Classification Search
CPC .......... G06F 17/30011; G06F 17/3053; G06F 17/30861; G06F 17/30864; H04L 67/10
USPC ....... 707/600, 602, 603, 723, 726, 727, 732, 707/748–751, 755, 758; 705/1.1, 7.11, 705/7.29, 7.31, 7.32, 7.37, 7.38, 7.39, 705/7.41, 319; 715/230, 233, 968
See application file for complete search history.

(56) References Cited

U.S. PATENT DOCUMENTS

| | | | | |
|---|---|---|---|---|
| 2006/0129446 | A1* | 6/2006 | Ruhl | G06F 17/30873 705/306 |
| 2006/0143158 | A1* | 6/2006 | Ruhl | G06F 17/30864 |
| 2008/0270209 | A1* | 10/2008 | Mauseth | G06Q 10/10 705/7.29 |
| 2008/0270389 | A1* | 10/2008 | Jones | G06F 17/30648 |
| 2010/0153404 | A1* | 6/2010 | Ghosh | G06F 17/30699 707/748 |

(Continued)

OTHER PUBLICATIONS

Anonymous, "Method to extract simple and compound terms from text corpuses (without performing full semantic analysis)", IP.com Prior Art Database Technical Disclosure. IP.com Electronic Publication Jul. 25, 2012. IP.com No. IPCOM000220204D. 6 pages.

(Continued)

Primary Examiner — Greta Robinson
(74) Attorney, Agent, or Firm — Nicholas D. Bowman

(57) ABSTRACT

Aspects of the disclosure include managing a set of data associated with a corpus. By analyzing the corpus, a domain is established to characterize the subject matter of the set of data. A user identifier is generated for a portion of the set of data. Based upon a credibility computation, a quality factor for a portion of the set of data is determined. The credibility computation includes using both the domain and the user identifier to determine the quality factor for the portion of the set of data. The quality factor for the portion of the set of data is compared with a threshold. In response to a quality factor for a portion of the set of data exceeding the threshold, the portion of the set of data is selected.

19 Claims, 8 Drawing Sheets

(56) References Cited

U.S. PATENT DOCUMENTS

2010/0306144 A1    12/2010  Scholz et al.
2011/0320442 A1    12/2011  Faruquie et al.
2012/0259866 A1*   10/2012  Austin ................ G06F 17/3089
                                                          707/748
2012/0296634 A1    11/2012  Revesz et al.
2014/0019443 A1     1/2014  Golshan

OTHER PUBLICATIONS

Anonymous, "Method of visualizing social comment interactions in a large web-document corpus", IP.com Prior Art Database Technical Disclosure. IP.com Electronic Publication Aug. 12, 2013. IP.com No. IPCOM000229976D. 3 pages.

Bhattarai, A., et al., "Characterizing Comment Spam in the Blogosphere through Content Analysis", IEEE Symposium on Computational Intelligence in Cyber Security, 2009. pp. 37-44. DOI: 10.1109/CICYBS.2009.4925088.

Heymann, P., et al., "Fighting Spam on Social Websites a Survey of Approaches and Future Challenges", IEEE Internet Computing, 2007. Issue: 6, vol. 11, pp. 36-45. DOI: 10.1109/MIC.2007.125.

* cited by examiner

Method 400

MANAGING A SET OF DATA

BACKGROUND

This disclosure relates generally to computer systems and, more particularly, relates to sets of data. The amount of data that needs to be managed by enterprises is growing at an increasing rate. Determining which sets of data are relevant can be burdensome or inefficient. As the amount of data continues to increase, the need to efficiently manage sets of data may also increase.

SUMMARY

Aspects of the disclosure may include a computer implemented method and system for managing a set of data associated with a corpus. The method and system may include establishing, by analyzing the corpus, a domain to characterize the subject matter of the set of data. From the set of data, a user identifier may be generated for a portion of the set of data. A credibility computation may then be performed. Based upon the credibility computation, a quality factor for a portion of the set of data may be determined. The credibility computation may include using both the domain and the user identifier to determine the quality factor for the portion of the set of data. The quality factor for the portion of the set of data may be compared with a quality factor threshold. In response to a quality factor for a portion of the set of data exceeding the quality factor threshold, the portion of the set of data may be selected.

Aspects of the disclosure may include generating a user identifier. From a set of data, a portion of the set of data having a common feature may be extracted. A user identifier may then be assigned to the portion of the set of data having the common feature. In response to assigning a user identifier to the portion of the set of data having a common feature, the user identifier may be stored in a data repository. The data repository may be retroactively updated by evaluating portions of sets of data assigned to a user identifier.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
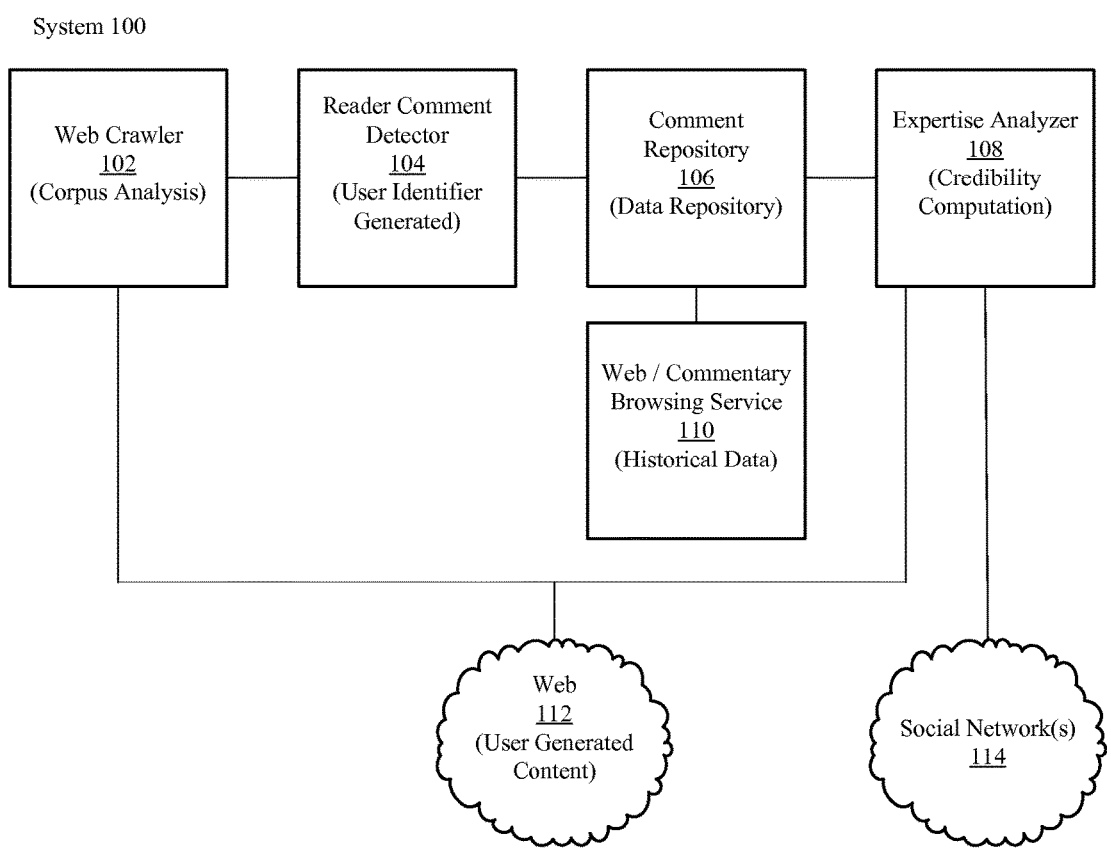
FIG. 1 illustrates an example system according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a computer implemented method and system for identifying and viewing subject matter expertise among comments made by a user to web page content (e.g., a journal article/corpus). The computer implemented method and system may identify comment sections (e.g., sets of data) as well as specific comments on websites (e.g., portions of sets of data). If the comment sections and specific comments are identified, the method and system may analyze the specific comments for relevancy and credibility with respect to the associated topic (i.e., domain). Specific comments determined to be relevant and credible may be marked or differentiated for a website visitor to view. In embodiments, the computer implemented method and system does not rely on a separate system to create user comments but rather may use a comment system native to the web page.

Many news articles on the internet have a "comments" section, where users can provide opinions and potential corrections regarding the content within an article. When an author of an article does not have a sufficient background of expertise within the topic of the article (e.g., technology-oriented articles), corrective comments made by the readers can be very helpful. These corrective comments may be especially helpful if they are made by a user who has expertise within the topic of the article. Unfortunately, identifying the corrective comments with expertise out of a large volume of comments made is a laborious exercise.

There are a number of tools and services supporting general web page annotation. For example, currently a user may overlay notes on comments made to a website and share the notes with a community of others. However, such tools and services do not identify expertise among comments native to the webpage (i.e., comments entered using the website's standard comment system). In addition, the tools and services may actually depend on browser plug-ins to facilitate a comment system.

Aspects of the disclosure include a computer implemented method and system for managing a set of data associated with a corpus. The method and system may include establishing a domain to characterize the subject matter of the set of data by analyzing the corpus. From the set of data, a user identifier is generated for a portion of the set of data. A credibility computation is then performed. Based upon the credibility computation, a quality factor for a portion of the set of data is determined. The credibility computation may include using both the domain and the user identifier to determine the quality factor for the portion of the set of data. The quality factor for the portion of the set of data may be compared with a quality factor threshold. In response to a quality factor for a portion of the set of data exceeding the quality factor threshold, the portion of the set of data is selected. Put differently, the portion of the set of data is selected if the quality factor for the portion of the set of data exceeds a quality factor threshold.

Aspects of the disclosure include analyzing the corpus. For example, analyzing the corpus may include using techniques such as a web crawler technique, a pattern recognition technique, a natural language processing technique, or any other appropriate technique. The domain to characterize the subject matter of the data may include a topic to classify a specific data element. The set of data may include user-provided content from the corpus. User provided content can be commentary. User provided content can also be commentator names. The corpus may include a user-generated file. In embodiments, a user-generated file may include a news document, publication, patent document, social media document, or any other type of user-generated file.

Aspects of the disclosure include generating a user identifier. From the set of data, a portion of the set of data having a common feature can be extracted. The portion of the set of data may include, for example, a social network identifier associated with the common feature. A user identifier can be assigned to the portion of the set of data having the common feature. In embodiments, assigning the user identifier may include computing a probability that a specific user created the portion of the set of data. Computing a probability that a specific user created the portion of the set of data may include using a natural language processing technique. In response to assigning the user identifier to the portion of the set of data having the common feature, the user identifier can be stored in a data repository. Storing the user identifier in a data repository may include mapping the user identifier to the portion of the set of data.

Aspects of the disclosure include a credibility computation. The credibility computation may include, for example, a score value for the user identifier in the domain. The score value for the user identifier in the domain can be compared with a score value threshold. A determination of credibility for a user identifier based on the comparison can be computed. In embodiments, the quality factor can be based on a quality score which indicates the extent of credibility for a user identifier within a particular subject matter. The quality score may be computed by awarding points to a user identifier based upon historical data.

Aspects of the disclosure include storing, in the data repository, the portion of the set of data assigned to the user identifier. In embodiments, the portion of the set of data can be evaluated and assigned a relevancy score. Evaluating the portion of the set of data may include using techniques such as machine learning techniques, keyword techniques, or embedded link analysis techniques. Based upon evaluating the portion of the set of data, the portion of the set of data may be removed from the data repository if the portion's relevancy score is found to be below a relevancy score threshold. Aspects of the disclosure provide a methodology for managing sets of data that may provide benefits associated with increased efficiency.

FIG. 1 illustrates an example system 100 according to embodiments. The system 100 is presented to show an example of how the components of the system 100 may interact. The system 100 is presented by way of example and is not intended to be limiting.

In FIG. 1, the system 100 includes a web crawler 102. The web crawler 102 may be similar to that used in web search engines. The web crawler 102 may collect data from the web 112. The web 112 may include a corpus. In embodiments, the corpus may include user-generated content 112, such as a news document, publication, patent document, or social media document. The web crawler 102 may perform a corpus analysis. In embodiments, analyzing the corpus may include using techniques such as a web crawler technique, a pattern recognition technique, or a natural language processing technique. Data collected by the web crawler may be sent to a reader comment detector 104. The reader comment detector 104 may identify user-generated content. For example, the reader comment detector 104 may use techniques such as natural language processing or pattern recognition to identify user-generated content 112. In certain embodiments, user generated content 112 may include individual comments, commentator names, or commentator identifications. The reader comment detector 104 may generate, from a portion of the user-generated content, a user identifier.

Sets of data identified by the reader comment detector 104 may be sent to a comment repository 106. The comment repository 106 may store the sets of data received from the reader comment detector 104. In embodiments, sets of data stored in the comment repository 106 may be accessed by other system 100 components at different times. The comment repository 106 may include a web/commentary browsing service 110. The web/commentary browsing service 110 may include historical data. In embodiments, historical data may include commentator activity (e.g., user annotations), social network activity (e.g., video sharing), publication activity (e.g., journal articles), or group association activity (e.g., user interactions with other users who share similar interests).

In response to a user query, the expertise analyzer 108 may examine user-generated content 112 stored in the comment repository 106. The expertise analyzer 108 may perform a credibility computation. For example, the expertise analyzer 108 may examine comments to assess degree of relevancy and expertise. Relevancy may be assessed using key words and phrases in comments and associated web content. In embodiments, web content may include news articles, publications and patent databases. Expertise may be assessed by analyzing user identifier information. Expertise may also be assessed by analyzing other comments made by a user across various websites. In certain embodiments, expertise may be assessed by analyzing social network properties of the commentator through social network(s) 114.

Figure 2:
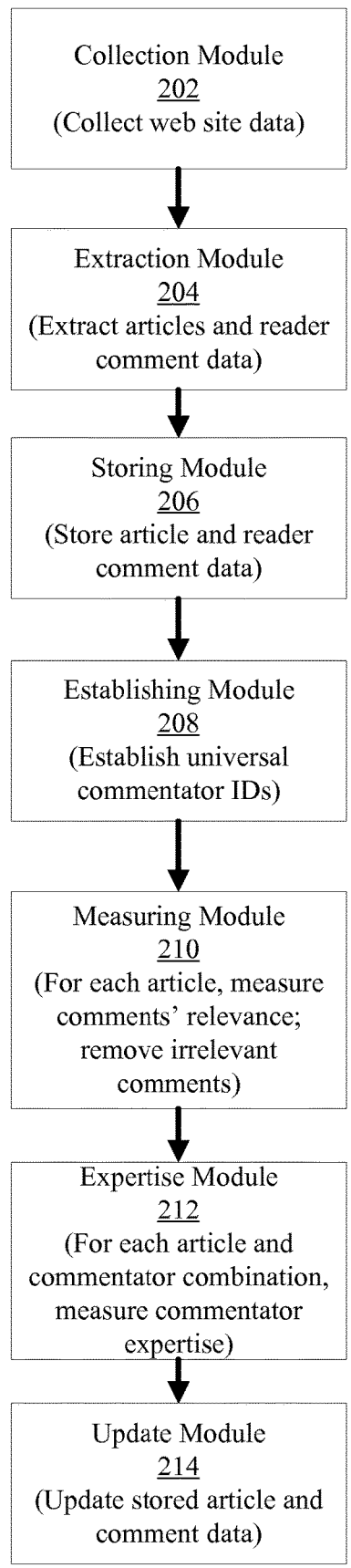
FIG. 2 illustrates an example system for comment analysis according to embodiments.

FIG. 2 illustrates an example system 200 according to embodiments. The system 200 is presented to show comment analysis modules. For example, data may be collected in a collection module 202 by a web crawler, such as web crawler 102 shown in FIG. 1. In addition, this may include a mapping of the World Wide Web traversing uniform resource locator references within web pages by a web search engine. In response to data that is collected by a web crawler in collection module 202, articles and reader comment sections may be identified in an extraction module 204. Extracting articles and reader comment data in the extraction module 204 may include one or more methodologies. For example, pattern recognition of the layout of a website may be used. Comments can follow an article and a section may be identified as a comment section or similar. Another example may be to adopt user annotation of web site layouts. This may include using a crowdsourcing approach, where users may highlight a part of the web page and label the part of the web page as a comment section or simply provide a comment. Data that is extracted in extraction module 204 may then be stored in a storing module 206.

In embodiments, user identifiers may be established in an establishing module 208. A user identifier may be a commentator identifier. In particular embodiments, the user identifier may be universal. For example, a user identifier may be used to identify commentators across different web sites so that analysis of their expertise on a given subject can be evaluated on a broad scale. A social network identifier may be used to establish a user identifier if a social network service is used to implement the comment system. Additionally, a combination of similarity among user identifiers and among associated articles may be used to estimate the likelihood that particular commentators are in fact the same person. For instance, if "Randy S. Marsh," "R. Marsh," or "Randy Marsh" are commentators on different websites but all have a history of commenting on the same subject matter, then the system 200 may determine that these commentators are the same individual. The establishing module 208 may then assign a unique user identifier and may map the assigned user identifier to an actual identifier if one is found. The user identifiers may be stored in a data repository. Data initially stored in the data repository may be removed in a measuring module 210. Techniques such as machine learning, keyword analysis, and embedded link analysis may be used in the measuring module 210 to mark and identify irrelevant comments.

For an article and commentator combination, the system may measure expertise of a commentator for a given user-generated content in an expertise module 212. Data sources for the expertise assessment in the expertise module 212 may include commentator activity, social network activity, or background data from the internet. A scoring system may be used to establish expertise. For example, if a commentator consistently comments on related articles over a prescribed period of time, that may grant the commentator expertise points. Further, article similarity may be assessed by techniques such as keyword similarity, similarity of website sections under which they appear, or hyperlinks shared among associated articles. Expertise may also be assessed using social network activity. If social network activity of a commentator is accessible by the system 200, the "likes" made by a commentator, various postings, group membership, and associations of friends may be used to assess expertise on a given subject matter. Finally, data from article citation sources may also be used. For example, publication databases and patent databases may be used. If the commentator has been heavily published and cited in subject matter related to the article in question, this may contribute to the expertise score. After an expertise score has been established, the data repository in an update module 214 is updated with information previously assessed and generated in the previous modules of this system.

Figure 3:
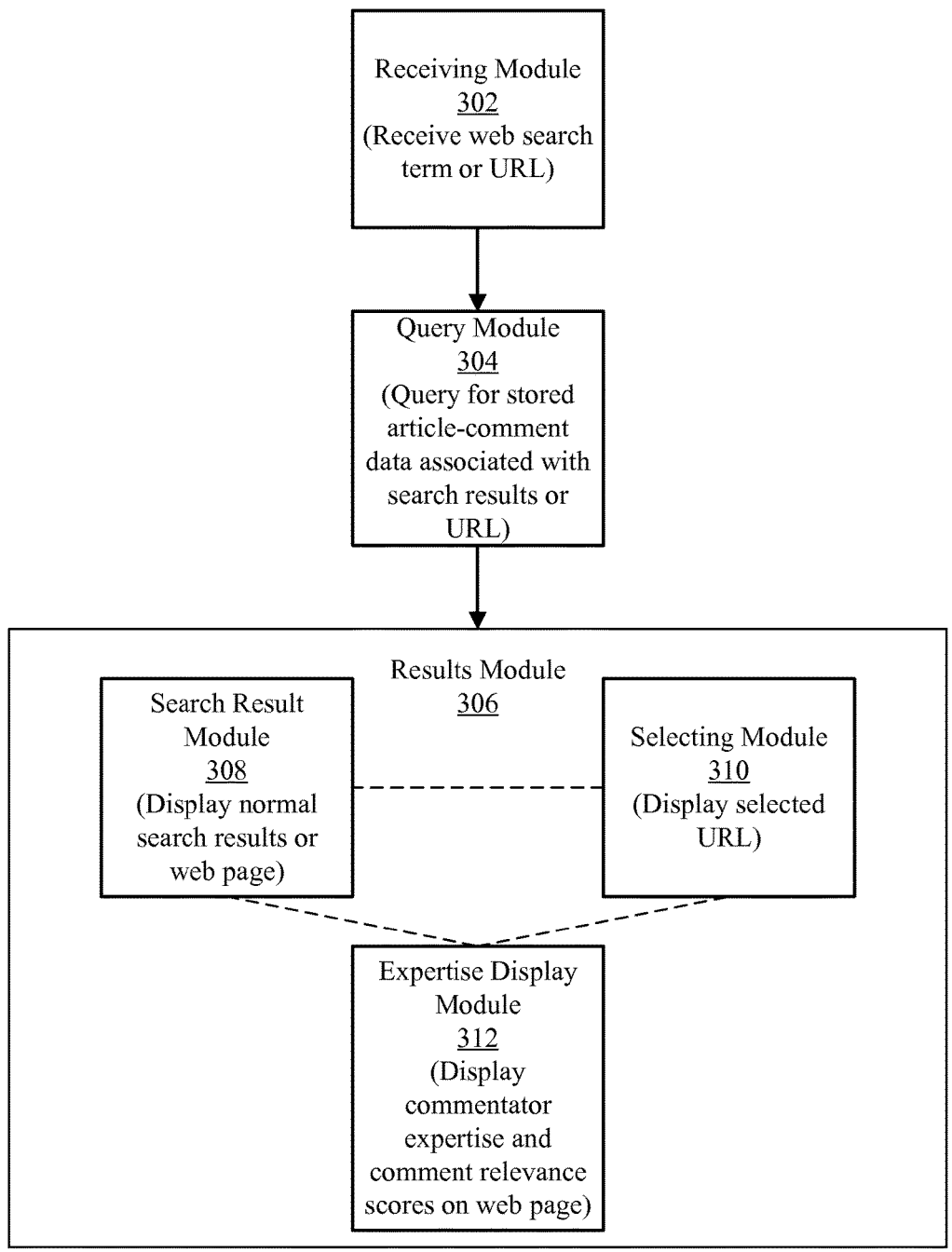
FIG. 3 illustrates an example system for a comment display according to embodiments.

FIG. 3 illustrates an example system 300 according to embodiments. The system 300 is presented to show an example of how comments may be displayed. In embodiments, a user may access the system to search the World Wide Web for information in a receiving module 302. A user may also enter a uniform resource locator (e.g., URL, web address) directly into the system. The system in a query module 304 may query the repository to search for any articles related to or matching the search terms of the uniform resource locator inputted by a user. For example, this may be done using standard web search article retrieval techniques based on keywords. In a results module 306, the system 300 may determine whether or not article-comment data is found based upon a user search in the receiving module 302. If no article or commentary can be found in response to the search, search results may not be returned to the user. Accordingly, the search results or web page may be displayed in their original format in a search result module 308. If, in the results module 306, relevant article-comment data is identified, the relevant articles may be prioritized in search results in a selecting module 310. In embodiments, when an article is selected for viewing, the article may be presented with comments from expert commentators highlighted in an expertise display module 312. These comments may be highlighted in place where they appear in the article or they may be shown in a sidebar to the original webpage. In certain embodiments, highlighting may include marking, displaying, or differentiating the relevant text discovered in the results module 306.

Figure 4:
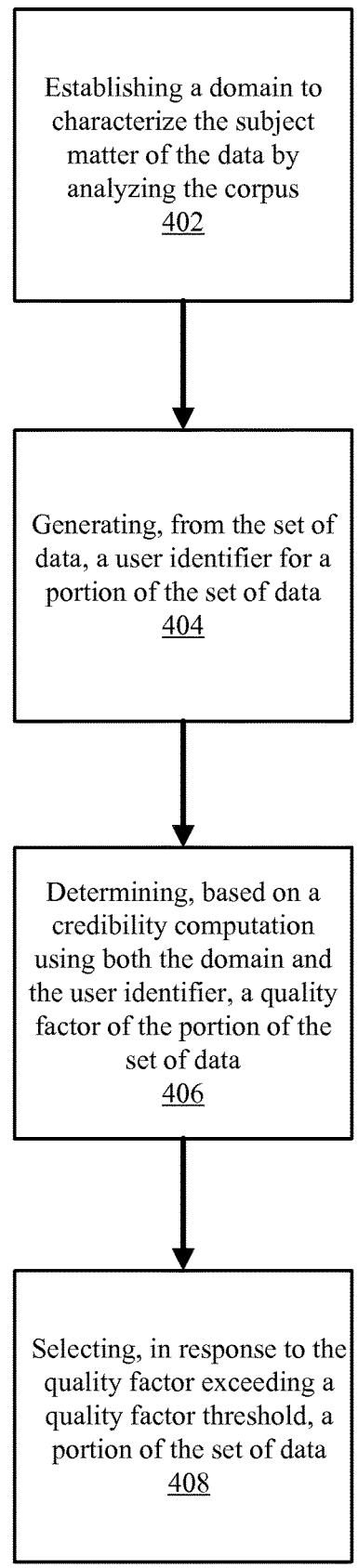
FIG. 4 illustrates an example method for managing a set of data associated with a corpus according to embodiments.

FIG. 4 illustrates a method 400 according to embodiments. The method 400 illustrates a method for managing a set of data associated with a corpus. For example, a corpus may include a collection of writings or a body of knowledge encompassing a variety of specific subjects. In operation 402, the method 400 may include establishing a domain to characterize the subject matter of the data by analyzing the corpus. The domain to characterize the subject matter of the data in operation 402 may include a topic (e.g., cloud computing articles, cooking, and sports) to classify a specific data element (e.g., competitive swimming). The set of data may include user-provided content. For example, user-provided content may include commentary (e.g., user annotations) or the names of commentators (e.g., Randy Marsh). In embodiments, the corpus may include user-generated files. User-generated files may include news documents, publications, patent documents, or social media documents (e.g., still images). Further, analyzing the corpus in operation 402 may include using techniques such as a web crawler technique, a pattern recognition technique (e.g., a comments section follows an article), or a natural language processing technique (e.g., sorting semantic and syntactic content).

From the set of data, a user identifier may be generated for a portion of the set of data in operation 404. A portion of the set of data having a common feature may be extracted. For example, a common feature may include a specific subject matter topic (e.g., resource allocation in cloud computing). In embodiments, the portion of the set of data may include a social network identifier associated with the common feature. A user identifier may be assigned to the portion of the set of data having the common feature. For example, if a social network service is used to implement a comment system, a social network identifier associated with the social network service may be used to assign a user identifier. In embodiments, assigning the user identifier may include computing a probability that a specific user created the portion of the set of data. In further embodiments, computing a probability that a specific user created the portion of the set of data may include using a natural language processing technique. For instance, if "Randy S. Marsh," "R. Marsh," or "Randy Marsh" are commentators on different websites but all have a history of commenting on the same subject matter, then the method 400 may determine that these commentators are likely to be the same individual.

In operation 406, based on a credibility computation, a quality factor of the portion of the set of data may be determined. In embodiments, the credibility computation may include using both a domain and a user identifier in the computation. The quality factor may be based on a quality score. The quality score may indicate the extent of credibility of a user identifier for a particular subject matter. For example, the quality score may be computed by awarding points to a user identifier based upon historical data. In embodiments, historical data may include commentator activity, social network activity, publication activity, or group association activity. Thus, if a commentator consistently comments on related articles over a prescribed period of time (e.g., 1 year), the user identifier may be awarded points. For instance, a user may comment on a journal article regarding a specific topic. The credibility computation for the comment made by the user may include awarding points to the user identifier for publications written by the user as well as social network activities the user partakes in associated with the specific topic. In addition, the credibility computation may award points to the user identifier based upon previous comments made within comparable topics associated with the journal article.

In operation 408, a comparison may be performed. The comparison may include comparing a quality factor of the portion of the set of data with a quality factor threshold. In embodiments, if a first score value for a quality factor for a portion of the set of data exceeds a second score value of a quality factor threshold, the portion of the set of data may be selected. In various embodiments, if a first score value for a quality factor for a portion of the set of data exceeds a second score value of a quality factor threshold, the portion of the set of data may be credible. In particular embodiments, if a first score value for a quality factor for a portion of the set of data exceeds a second score value of a quality factor threshold, the user identifier associated with the portion of the set of data may be credible. Accordingly, selecting the portion of the set of data exceeding the quality factor threshold may include marking or displaying.

For example, a quality score may be given to a quality factor in a manner similar to the example described in the previous paragraph associated with operation 406. The quality score may then be compared against a predetermined quality factor threshold. The quality factor threshold may be based upon a user defined value. The quality factor threshold may also be based upon previous quality factor threshold values inputted by various users associated with topics similar to the portion of the set of data. In addition, the quality threshold may be based upon values previously defined by the system 400 for the domain. If the quality score is greater than the previously defined values described above, the portion of the set of data may be selected so that a reader who queried the system may be alerted in a visual manner that a portion of a set of data may be more credible than another portion of a set of data.

Figure 5:
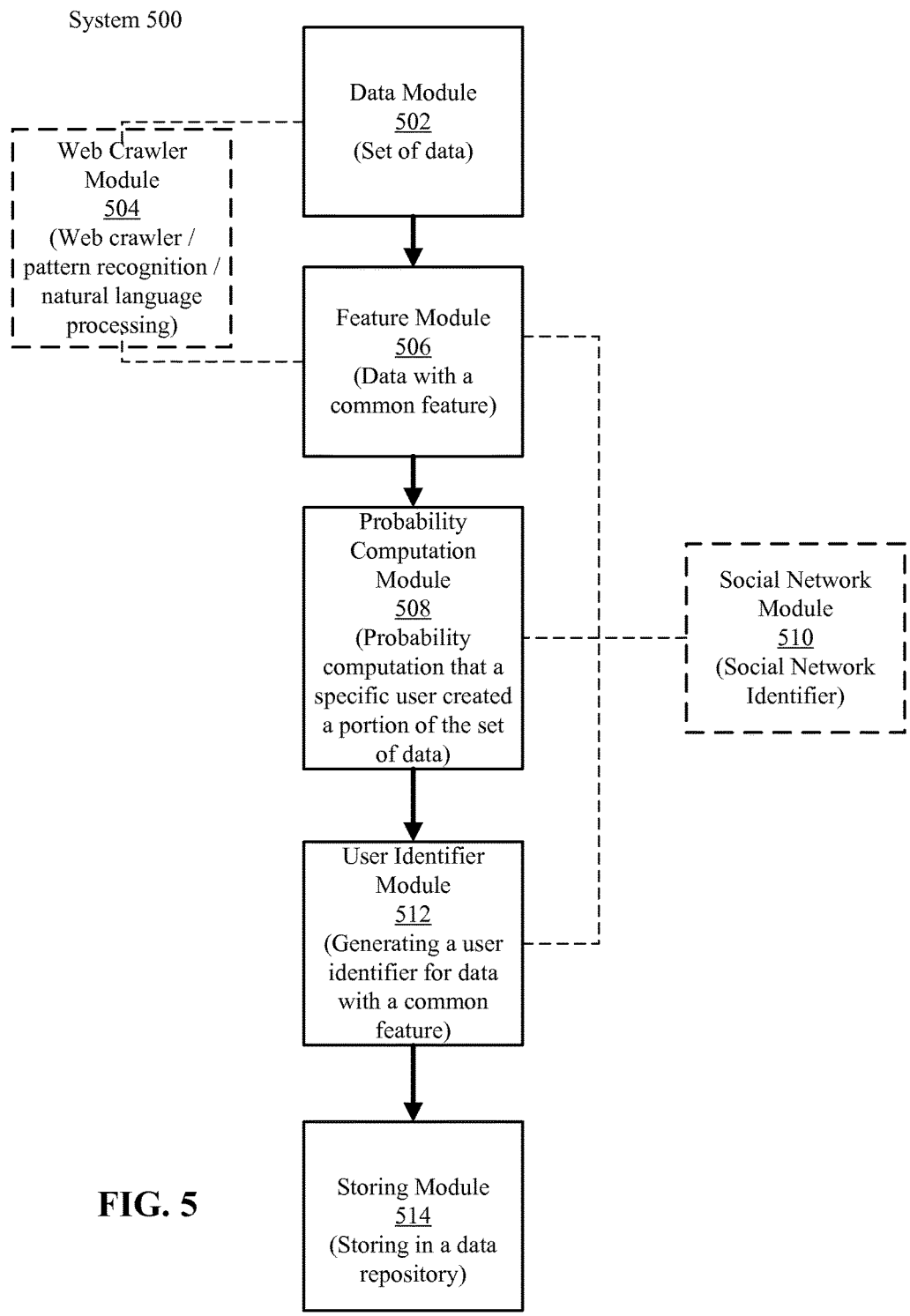
FIG. 5 illustrates an example system for generating user identifiers according to embodiments.

FIG. 5 illustrates an example system 500 according to embodiments. The system 500 is presented to show how a user identifier may be generated. In embodiments, from a set of data in a data module 502, a portion of the set of data may be differentiated having a common feature in a feature module 506. For example, a web crawler module 504 may be used to identify a common feature to separate a portion of the set of data from the set of data. In certain embodiments, the web crawler module 504 may use pattern recognition or natural language processing to identify and separate a portion of the set of data having a common feature from the set of data. In addition, a portion of the set of data may be differentiated having a common feature in a social network module 510. In certain embodiments, if a user is a member of a social network group across various social network services, this may be considered data with a common feature. For example, a journal article may have user annotations which follow the journal article. The web crawler 504 may identify the user annotations and separate them from the journal article. If the user annotations associated with the journal article are implemented through a social network service, the web crawler may identify the user annotations as well as the social network service used.

If, in the feature module 506, a portion of a set of data is identified to have a common feature, the system 500 may initiate a probability computation that a specific user created a portion of the set of data in a probability computation module 506. In embodiments, computing a probability that a specific user created the portion of the set of data may include using a natural language processing technique. For instance, if "Randy S. Marsh," "R. Marsh," or "Randy Marsh" are commentators on different websites but all have a history of commenting on the same subject matter, then the system 500 may determine that these commentators are likely to be the same individual. In an additional example, if a particular commentator uses specific phrases or comments consistently across various websites with an opinion regarding a specific topic, the system 500 may use natural language processing to identify the particular commentator. In certain embodiments, the social network module 510 may be used in the probability computation module 506 to calculate that a specific user created the portion of the set of data. For example, one of the different websites mentioned above may be a social network website. If a social network service is used to implement a comment system following a journal article, the system 500 may identify a specific user based upon a user identifier associated with the social network service.

Embodiments may include a user identifier module 512. A user identifier may be generated in the user identifier module 512 if, in the probability computation module 508, the system 500 determines that a specific user created the portion of the set of data. A user identifier may be assigned to the portion of the set of data. In certain embodiments, the user identifier module 512 may use a social network module 510 to assign a user identifier to a specific user. For example, if a social network service is used to implement a comment system, the social network module 510 may use a social network service user identifier to assign the user identifier associated with the portion of the set of data.

When a user identifier is assigned to a portion of the set of data, it may be stored in a storing module 514. In embodiments, a user identifier previously assigned to a portion of a set of data may be mapped to the user identifier generated for the portion of the set of data. The storing module 514 may be retroactively updated with data previously assessed and generated in previous modules in the system 500. In certain embodiments, if a user had been previously assigned a first user identifier based upon comments made and then is subsequently assigned a second additional user identifier, the first and second user identifiers may be mapped and assigned to the same user. For example, if a user is assigned a user identifier for a topic within sports and is assigned a user identifier for a topic within cloud computing, the user identifier for sports and the user identifier for cloud computing may be mapped and stored in the storing module 514 together.

Figure 6:
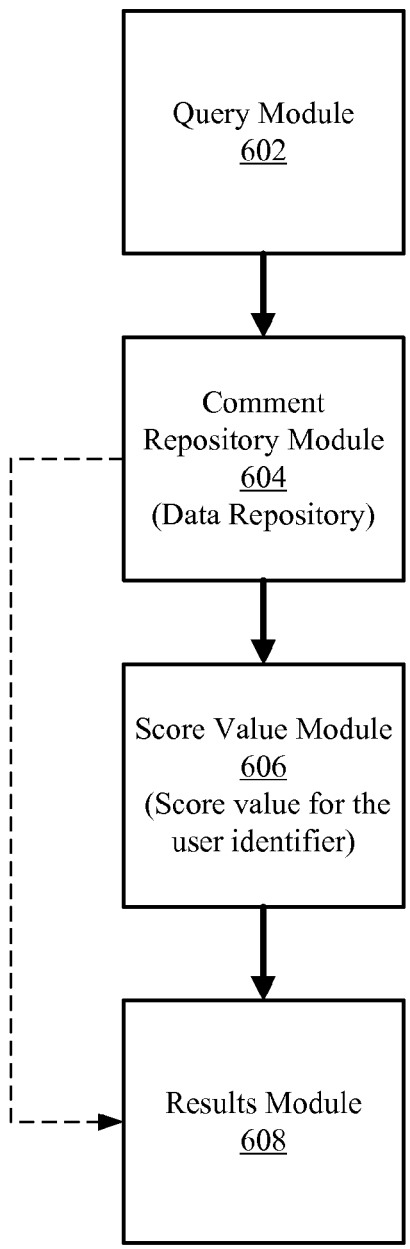
FIG. 6 illustrates an example system for a comment display operation according to embodiments.

FIG. 6 illustrates an example system 600 according to embodiments. The system 600 is presented to show a comment display operation. In embodiments, a user may access the system 600 to search for information. The system 600 may include the World Wide Web. A user may run the system 600 to access a query module 602. A user may enter a uniform resource locator (e.g., URL, website address) directly into the query module 602. In embodiments, a user may control the query module 602 to search for specific terms. The query module 602 may search the comment repository module 604 to identify any data related to or matching the search terms of the user. For example, searching the comment repository 604 may include using keyword analysis or natural language processing techniques (e.g., sorting semantic and syntactic content).

If the query module 602 is unable to locate in the comment repository 604 any data relating to a user search, search results may not be returned to the user in a results module 608. For example, if no article or commentary is found in response to a search, data will appear in its original format. Conversely, if the query module 602 is able to locate within the comment repository 604 data relating to a user search, a score value may be assigned to the data relating to the user search in a score value module 606. For instance, the score value may be calculated in a similar manner to the expertise module 212 in system 200. In embodiments, if a first score value for data found within the comment repository 604 relating to a user search exceeds a second score value of a score value threshold, the portion of the set of data may be determined to be credible. Portions of sets of data which are determined to be credible in the score value module 606 may be displayed in the results module 608. Displaying the portions of the sets of data may include prioritizing sets of data with higher score values. Displaying the portions of the sets of data may include highlighting or differentiating the portions of the sets of data. For example, if a user queries the system 600 and selected an article for viewing, the article may be presented with comments from credible commentators highlighted. Additionally, the credible commentators and their subsequent comments may be shown in a sidebar to the original webpage.

Figure 7:
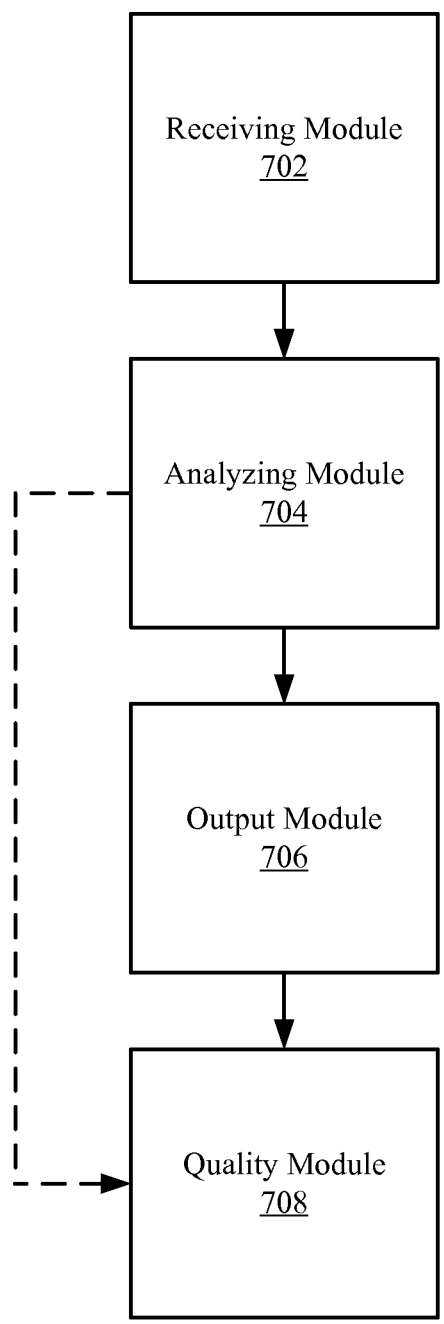
FIG. 7 illustrates an example system for a credibility computation according to embodiments.

FIG. 7 illustrates an example system 700 according to embodiments. The system 700 is presented to show a credibility computation operation. In a receiving module 702, the system 700 may receive a portion of a set of data. For example, a portion of a set of data may be a comment posted on an article by a specific user. In embodiments, the receiving module 702 may receive a user identifier for the portion of the set of data as well as a domain category. In various embodiments, the domain category may be predetermined (e.g., Geology, Sedimentary Compositions). For example, user Randy Marsh may comment on an article discussing the scientific aspects of the Grand Canyon. The receiving module 702 may receive the comment made by Randy Marsh, the user identifier for Randy Marsh, and the domain for the comment (e.g., Geology). An analyzing module 704 may evaluate the specific user identification for the domain of the portion of the set of data. In certain embodiments, the analyzing module 704 may include an algorithm.

For example, the algorithm in the analyzing module 704 may award points to user identifiers within specific domains. For instance, the user identifier associated with Randy Marsh may initially be awarded points for his previous internet activities associated with geology. The system 700 may determine that his user identifier has recently commented on various articles relating to earthquakes over the past few weeks (i.e., 3 points awarded), published a study on geochronology (i.e., 4 points awarded), and started a social network group for geology enthusiasts (i.e., 3 points awarded), for a total of 10 points. Conversely, if a second user, Jim Kern, also comments on the same article user Randy Marsh commented on, the user identifier associated with Jim Kern may also initially be awarded points for his previous internet activities associated with the Grand Canyon. For example, the user identifier associated with Jim Kern may have recently commented on an article discussing activities to do within Arizona (i.e., 1 point awarded), posted a blog entry discussing his hunting trip in the Grand Canyon (i.e., 1 point awarded), and is a member of a pet rock social network group (i.e., 1 point awarded), for a total of 3 points.

The algorithm in the analyzing module 704 may compare the points awarded to a user identifier with a quality factor threshold. In embodiments, the quality factor threshold may be predetermined. In the example cited above, the analyzing module 704 may predetermine a quality factor threshold of 7 points. Thus, the 10 points awarded to the user identifier associated with Randy Marsh may be compared with the quality factor threshold of 7 points and the 3 points awarded to the user identifier associated with Jim Kern may be compared with the quality factor threshold of 7 points. As a result, the comment made by Randy Marsh exceeds the quality factor threshold and may be highlighted or displayed in a sidebar of the journal article. Conversely, the comment made by Jim Kern does not exceed the quality factor threshold and may be displayed in the manner native to the web site.

In response to the analyzing module 704, an output module 706 may generate a quality score. The output module 706 may include an algorithm to calculate the quality score. The quality score may be a numerical value. The quality score may indicate the extent of credibility that a user identifier has within a specific domain. For example, the user Randy Marsh in the previous example may have a quality score of 80/100 within a sedimentary rock domain. From the output module 706, a quality module 708 may generate a quality factor. In embodiments, the system 700 may be configured to bypass the output module 706. The quality factor may be based upon the user identifier, the portion of the set of data, the domain, or the quality score.

Figure 8:
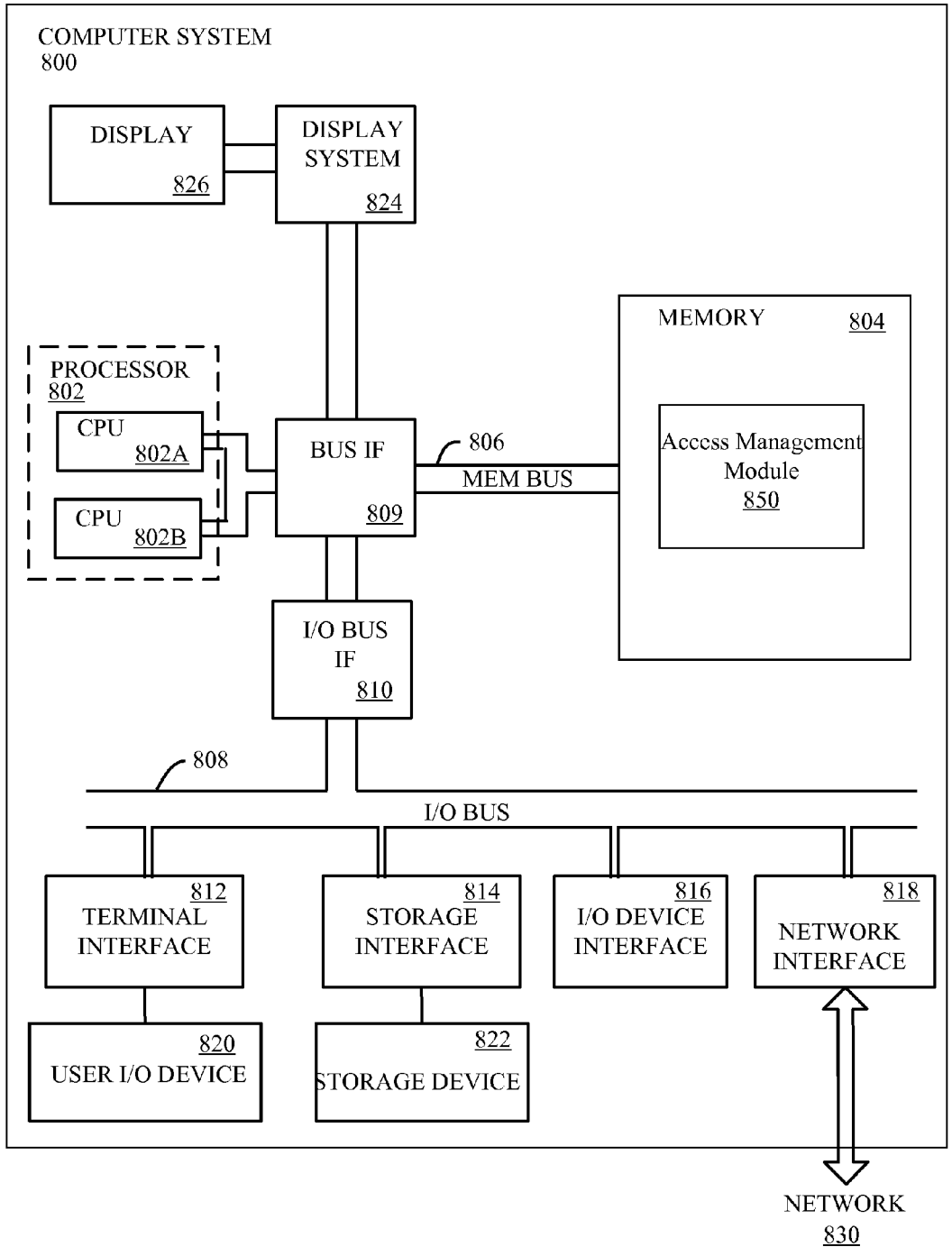
FIG. 8 illustrates an example system for implementing various embodiments according to embodiments.

FIG. 8 depicts a high-level block diagram of a computer system 800 for implementing various embodiments. The mechanisms and apparatus of the various embodiments disclosed herein apply equally to any appropriate computing system. The major components of the computer system 800 include one or more processors 802, a memory 804, a terminal interface 812, a storage interface 814, an I/O (Input/Output) device interface 816, and a network interface 818, all of which are communicatively coupled, directly or indirectly, for inter-component communication via a memory bus 806, an I/O bus 808, bus interface unit 809, and an I/O bus interface unit 810.

The computer system 800 may contain one or more general-purpose programmable central processing units (CPUs) 802A and 802B, herein generically referred to as the processor 802. In embodiments, the computer system 800 may contain multiple processors; however, in certain embodiments, the computer system 800 may alternatively be a single CPU system. Each processor 802 executes instructions stored in the memory 804 and may include one or more levels of on-board cache.

In embodiments, the memory 804 may include a random-access semiconductor memory, storage device, or storage medium (either volatile or non-volatile) for storing or encoding data and programs. In certain embodiments, the memory 804 represents the entire virtual memory of the computer system 800, and may also include the virtual memory of other computer systems coupled to the computer system 800 or connected via a network. The memory 804 can be conceptually viewed as a single monolithic entity, but in other embodiments the memory 804 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 804 may store all or a portion of the various programs, modules and data structures for processing data transfers as discussed herein. For instance, the memory 804 can store an access management module 850. In embodiments, the access management module 850 may include instructions or statements that execute on the processor 802 or instructions or statements that are interpreted by instructions or statements that execute on the processor 802 to carry out the functions as further described herein. In certain embodiments, the access management module 850 is implemented in hardware via semiconductor devices, chips, logical gates, circuits, circuit cards, and/or other physical hardware devices in lieu of, or in addition to, a processor-based system. In embodiments, the access management module 850 may include data in addition to instructions or statements.

The computer system 800 may include a bus interface unit 809 to handle communications among the processor 802, the memory 804, a display system 824, and the I/O bus interface unit 810. The I/O bus interface unit 810 may be coupled with the I/O bus 808 for transferring data to and from the various I/O units. The I/O bus interface unit 810 communicates with multiple I/O interface units 812, 814, 816, and 818, which are also known as I/O processors (IOPs) or I/O adapters (IOAs), through the I/O bus 808. The display system 824 may include a display controller, a display memory, or both. The display controller may provide video, audio, or both types of data to a display device 826. The display memory may be a dedicated memory for buffering video data. The display system 824 may be coupled with a display device 826, such as a standalone display screen, computer monitor, television, or a tablet or handheld device display. In one embodiment, the display device 826 may include one or more speakers for rendering audio. Alternatively, one or more speakers for rendering audio may be coupled with an I/O interface unit. In alternate embodiments, one or more of the functions provided by the display system 824 may be on board an integrated circuit that also includes the processor 802. In addition, one or more of the functions provided by the bus interface unit 809 may be on board an integrated circuit that also includes the processor 802.

The I/O interface units support communication with a variety of storage and I/O devices. For example, the terminal interface unit 812 supports the attachment of one or more user I/O devices 820, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 820 and the computer system 800, and may receive output data via the user output devices. For example, a user interface may be presented via the user I/O device 820, such as displayed on a display device, played via a speaker, or printed via a printer.

The storage interface 814 supports the attachment of one or more disk drives or direct access storage devices 822 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 822 may be implemented via any type of secondary storage device. The contents of the memory 804, or any portion thereof, may be stored to and retrieved from the storage device 822 as needed. The I/O device interface 816 provides an interface to any of various other I/O devices or devices of other types, such as printers or fax machines. The network interface 818 provides one or more communication paths from the computer system 800 to other digital devices and computer systems; these communication paths may include, e.g., one or more networks 830.

Although the computer system 800 shown in FIG. 4 illustrates a particular bus structure providing a direct communication path among the processors 802, the memory 804, the bus interface 809, the display system 824, and the I/O bus interface unit 810, in alternative embodiments the computer system 800 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 810 and the I/O bus 808 are shown as single respective units, the computer system 800 may, in fact, contain multiple I/O bus interface units 810 and/or multiple I/O buses 808. While multiple I/O interface units are shown, which separate the I/O bus 808 from various communications paths running to the various I/O devices, in other embodiments, some or all of the I/O devices are connected directly to one or more system I/O buses.

In various embodiments, the computer system 800 is a multi-user mainframe computer system, a single-user system, or a server computer or similar device that has little or no direct user interface, but receives requests from other computer systems (clients). In other embodiments, the computer system 800 may be implemented as a desktop computer, portable computer, laptop or notebook computer, tablet computer, pocket computer, telephone, smart phone, or any other suitable type of electronic device.

FIG. 8 depicts several major components of the computer system 800. Individual components, however, may have greater complexity than represented in FIG. 8, components other than or in addition to those shown in FIG. 8 may be present, and the number, type, and configuration of such components may vary. Several particular examples of additional complexity or additional variations are disclosed herein; these are by way of example only and are not necessarily the only such variations. The various program components illustrated in FIG. 8 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for generating a qualified set of data, the method comprising:
receiving, by at least one processor, an input set of data;
determining, by the at least one processor analyzing the input set of data, a domain that characterizes a subject matter of the input set of data;
computing, by extracting a common feature from the input set of data by the at least one processor, a probability that a specific user created a first portion of the input set of data;
identifying, by the at least one processor, the first portion of the input set of data based, at least in part, on the first portion of the input set of data having the common feature;
generating, by the at least one processor, based, at least in part, on the domain, on the probability and on the first portion of the input set of data having the common feature, a user identifier associated with the first portion of the input set of data;
storing, by the at least one processor, the user identifier in a data repository;
computing, by the at least one processor, based at least in part on the domain and the user identifier, a credibility measure;
computing, by the at least one processor, based at least in part on the credibility measure, a quality factor associated with the first portion of the input set of data;
generating, by the at least one processor, based at least in part on the quality factor exceeding a quality factor threshold, the qualified set of data comprising data, among the first portion of the input data, that exceeds the quality threshold; and
outputting, by the at least one processor, the qualified set of data.

2. The method of claim 1, wherein the input set of data includes user-provided content within a corpus.

3. The method of claim 2, wherein the user-provided content includes at least one of commentary or commentator names.

4. The method of claim 1, wherein the input set of data includes a user-generated file.

5. The method of claim 4, wherein the user generated file comprises at least one of a news document, a published document, a patent document and a social media document.

6. The method of claim 1, wherein the analyzing the input set of data includes using at least one of a web crawler technique, a pattern recognition technique, and a natural language processing technique.

7. The method of claim 1, wherein the domain includes a topic to classify a specific data element among the input set of data.

8. The method of claim 1, wherein the first portion of the input set of data includes a social network identifier associated with the common feature.

9. The method of claim 1, wherein the computing the probability comprises the at least one processor using a natural language processing technique.

10. The method of claim 1, wherein the storing the user identifier in the data repository includes the at least one processor mapping the user identifier to the first portion of the input set of data.

11. The method of claim 1, wherein the computing the credibility measure includes:
the at least one processor computing, by awarding points to the user identifier, a score value for the user identifier wherein the points are associated with a previous internet activity, associated with the domain, corresponding to the user identifier;
the at least one processor comparing the score value with a score value threshold; and
the at least one processor computing the credibility measure based on the comparison of the score value with the score value threshold.

12. The method of claim 1, wherein the quality factor is based on a quality score which indicates a level of credibility for the user identifier within the subject matter of the input set of data.

13. The method of claim 12, wherein the at least one processor computes the quality score by awarding points to the user identifier based upon historical data.

14. The method of claim 13, wherein the historical data comprises at least one of: commentator activity, social network activity, publication activity, and group association activity.

15. The method of claim 1, wherein the at least one processor outputting the qualified set of data comprises at least one of the at least one processor marking and the at least one processor displaying data among the qualified set of data.

16. The method of claim 1, further comprising the at least one processor:
storing, in the data repository, the first portion of the input set of data;
computing a relevancy score associated with the first portion of the input set of data;
determining that the relevancy score is below a relevancy score value threshold; and
removing, based on the relevancy score being below the threshold, the first portion of the input set of data from the data repository.

17. The method of claim 16, wherein the determining the relevancy score to be below the relevancy score value threshold includes the at least one processor using a technique comprising at least one of machine learning techniques, keyword techniques, or embedded link analysis techniques.

18. A computer program for generating a qualified set of data, the computer program product comprising a computer readable storage medium having instructions embodied therewith, the program instructions executable by a processor to cause the processor to:
receive an input set of data;
determine, by analyzing the input set of data, a domain that characterizes a subject matter of the input set of data;
compute, by extracting a common feature from the input set of data, a probability that a specific user created a first portion of the input set of data;
identify the first portion of the input set of data based, at least in part, on the first portion of the input set of data having the common feature;
generate, based, at least in part, on the domain, on the probability and on the first portion of the input set of data having the common feature, a user identifier associated with the first portion of the input set of data;
store the user identifier in a data repository;
compute a credibility measure, based at least in part on the domain and the user identifier;
compute, based at least in part on the credibility measure, a quality factor associated with the first portion of the input set of data; and
generate, based at least in part on the quality factor exceeding a quality factor threshold, the qualified set of data comprising data, among the first portion of the input data, that exceeds the quality threshold; and
output the qualified set of data.

19. A computer system for generating a qualified set of data, the computer system comprising a processor configured to:
receive an input set of data;
determine, by analyzing the input set of data, a domain that characterizes a subject matter of the input set of data;
compute, by extracting a common feature from the input set of data, a probability that a specific user created a first portion of the input set of data;
identify the first portion of the input set of data based, at least in part, on the first portion of the input set of data having the common feature;
generate, based, at least in part, on the domain, the probability and the first portion of the input set of data having the common feature, a user identifier associated with the first portion of the input set of data;
store the user identifier in a data repository;
compute, based at least in part on the domain and the user identifier, a credibility measure;
compute, based at least in part on the credibility measure, a quality factor associated with the first portion of the input set of data;
generate, based at least in part on the quality factor exceeding a quality factor threshold, the qualified set of data comprising data, among the first portion of the input data, that exceeds the quality threshold; and
output the qualified set of data.

* * * * *